(12) United States Patent
Dhaler et al.

(10) Patent No.: US 7,163,720 B1
(45) Date of Patent: Jan. 16, 2007

(54) HEAT-CURABLE SILICONE ADHESIVE COMPLEX WHEREOF THE INTERFACE HAS RELEASE FORCE CAPABLE OF BEING MODULATED

(75) Inventors: Didier Dhaler, Tassin (FR); André Lievre, Saint-Genis-Laval (FR); Christian Mirou, Lyons (FR); Christophe Guyot, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 503 days.

(21) Appl. No.: 10/148,034

(22) PCT Filed: Nov. 24, 2000

(86) PCT No.: PCT/FR00/03294

§ 371 (c)(1),
(2), (4) Date: Feb. 3, 2003

(87) PCT Pub. No.: WO01/38451

PCT Pub. Date: May 31, 2001

(30) Foreign Application Priority Data

Nov. 26, 1999 (FR) .................................. 99 14945

(51) Int. Cl.
*C08J 7/04* (2006.01)
*B32B 25/20* (2006.01)

(52) U.S. Cl. .......................... 427/515; 528/32; 528/41; 528/31; 428/447

(58) Field of Classification Search ................ 428/447; 528/32, 41, 31, 13; 427/515
See application file for complete search history.

(56) References Cited

U.S. PATENT DOCUMENTS

| 4,424,254 | A | * | 1/1984 | Hedrick et al. ............... 428/21 |
| 4,526,953 | A | | 7/1985 | Dallavia |
| 4,940,846 | A | * | 7/1990 | Hinterwaldner .......... 427/385.5 |
| 5,281,656 | A | * | 1/1994 | Thayer et al. ............... 524/601 |
| 5,616,629 | A | * | 4/1997 | Nguyen et al. ................ 522/40 |
| 5,891,530 | A | * | 4/1999 | Wright ........................ 427/515 |
| 5,969,025 | A | * | 10/1999 | Corzani ....................... 524/272 |
| 6,306,475 | B1 | * | 10/2001 | Stocq et al. ................ 428/40.1 |

FOREIGN PATENT DOCUMENTS

| DE | 198 31 775 A | 1/1999 |
| EP | WO 96 05962 A | 2/1996 |

* cited by examiner

*Primary Examiner*—Kuo-Liang Peng
(74) *Attorney, Agent, or Firm*—Buchanan Ingersoll & Rooney PC

(57) ABSTRACT

The invention concerns a silicone/adhesive complex comprising at least a silicone coating applied on a first support and an adhesive coating applied on a second support, and whereof the release force of a silicone/adhesive interface is capable of being modulated. The invention is characterized in that its silicone coating results from heat polymerization and/or curing of: either monomers, oligomers and/or polymers bearing at least a reactive Si—H structural unit and monomers, oligomers and/or polymers bearing at least a reactive unsaturated aliphatic group; or monomers, oligomers and/or polymers bearing at least a reactive Si—OH structural unit; or monomers, oligomers and/or polymers bearing at least a reactive Si—H structural unit and monomers oligomers and/or polymers bearing at least a reactive epoxy, oxetane and/or dioxolane unit; and said silicone coating further comprises at least an additive adjusting the release force of a silicone/adhesive interface and whereof the activity is photochemically initiated and adjustable.

28 Claims, 2 Drawing Sheets

HEAT-CURABLE SILICONE ADHESIVE COMPLEX WHEREOF THE INTERFACE HAS RELEASE FORCE CAPABLE OF BEING MODULATED

The present invention relates in general to complexes referred to as "self-adhesive" complexes composed especially of a nonstick silicone matrix and of an adhesive coating.

This type of complex is generally intended for use where the crosslinked or polymerized silicone matrix is affixed to a substrate so as to make it nonstick with respect to the adhesive. This type of complex is especially applicable in the field of adhesive protective papers, labels and decorative papers.

The silicone oils or resins that have been proposed in order to obtain this type of coating having nonstick properties derive in general from cationic photocrosslinkable systems. More particularly, they are one or more monomers, oligomers and/or polymers of the polyorganosiloxane type comprising functional and reactive radicals capable of forming intrachain and interchain bridges. These systems result, after UV or electron-beam polymerization and in the presence of a polymerization initiator, in nonstick coatings which form complexes called "self-adhesive" complexes with adhesives, which are applied to their surface in line or after silicone treatment.

An essential property of these silicone/adhesive complexes is therefore that they lend themselves to ready release of the adhesive from the silicone coating during their use.

Depending on the nature of the applications envisioned for this type of complex, it is desirable to adjust the release force needed to separate the silicone coating from the adhesive.

This release force may in this case be quantified. Although its values may vary significantly depending on the measurement method adopted, overall it can be characterized as follows for a low rate of release, that is to say of around 30 cm/min, and using the FTM3 method:

a release force of less than 15 g/cm is regarded as low;
a release force of greater than 15 g/cm and less than 70 g/cm is regarded as moderate; and
a release force of greater than 70 g/cm and preferably less than 200 g/cm is regarded as high.

It is an object of the present invention specifically to provide a silicone/adhesive complex whose release force may be adjusted as required and preferably to a value lying within the abovementioned range, namely between 15 g/cm and 200 g/cm.

More specifically, the present invention relates to the field of thermally polymerizable and/or crosslinkable adhesive/silicone complexes, for which the release force of their interface is photochemically adjustable.

Patent application DE 198 31 775 A already disclosed a silicone/adhesive complex having an adjustable release force. However, the ability of this complex to manifest an adjustable release force is directly associated with the chemical nature of the silicone matrix. The latter derives from acrylic polyorganosiloxanes and has acrylate crosslinking nodes. The adhesion of this silicone matrix to the adhesive film with which it is associated varies in magnitude depending on its degree of crosslinking. Moreover, in this prior art, the presence of a chromium salt in the silicone matrix is required in order to manifest this property.

As regards the present invention, this aims to provide a silicone/adhesive complex whose ability to manifest an adjustable release force is associated with the presence of a specific additive within the silicone matrix.

More particularly, the first subject of the present invention is a silicone/adhesive complex comprising at least one silicone coating applied to a first substrate and an adhesive coating applied to a second substrate, for which the release force of a silicone/adhesive interface is adjustable, characterized in that its silicone coating derives from the thermal polymerization and/or thermal crosslinking of:

either monomers, oligomers and/or polymers carrying at least one reactive Si—H structural unit and monomers, oligomers and/or polymers carrying at least one reactive unsaturated aliphatic group;

or monomers, oligomers and/or polymers carrying at least one reactive Si—H structural unit and monomers, oligomers and/or polymers carrying at least one reactive Si—OH unit;

or monomers, oligomers and/or polymers carrying at least one reactive Si—H structural unit and monomers, oligomers and/or polymers carrying at least one unit of the reactive epoxy, oxetane and/or dioxolane type;

and in that said silicone coating furthermore includes at least one additive for regulating the release force of a silicone/adhesive interface and the activity of which is initiated and adjustable photochemically.

This activation is preferably carried out by exposing if not the complex then at least its silicone/adhesive interface to at least one UV irradiation.

According to a first variant, the two substrates consist of two separate entities placed so that the silicone coating of the first substrate is in contact with the adhesive coating of the second substrate. This embodiment is in particular illustrated by systems called self-adhesive labels. In this particular case, the release force of the silicone/adhesive interface is exerted when the two substrates are being separated.

In a second variant, the two substrates each consist respectively of the two faces of the same entity. This second embodiment is in particular illustrated by the systems called adhesive tapes. The nonstick coating, that is to say that based on the silicone matrix, and the adhesive coating are brought into contact while a substrate is being wound up on itself. In this case, the release force is exerted at the silicone/adhesive interface under the effect of a lower face being separated from an upper face of the material.

According to a preferred embodiment of the invention, the additive for regulating the release force of a silicone/adhesive interface adopted within the context of the present invention is chosen from:

organic acrylics;
alkenyl ethers; and
acrylic silicones and/or silicones having alkenyl ether functional groups.

Especially suitable as organic acrylics are acrylate species and especially epoxidized acrylates; acrylo-glycero-polyesters; multifunctional acrylates; acrylo-urethanes; acrylo-polyethers; acrylo-polyesters, unsaturated polyesters; acrylo-acrylics.

More particularly preferred are trimethylpentane-dioltriacrylate, trimethylolpropane triacrylate, and tripropylene glycol diacrylate.

With regard to the alkenyl ethers, these may be chosen from cyclohexanedimethanol divinyl ether, triethylene glycol divinyl ether (DVE-3), hydroxybutyl vinyl ether, dodecyl vinyl ether and the other vinyl ethers sold by ISP and which are partly described in patent application WO 99/19371.

According to a preferred variant of the invention, this additive is chosen from acrylic or methacrylic silicones and/or silicones having alkenyl ether functional groups.

As representatives of acrylic or methacrylic silicone derivatives most particularly suitable for the invention, mention may more particularly be made of acrylic or methacrylic derivatives, ethers and esters. Among these are especially suitable polyorganosiloxanes having an acrylate and/or methacrylate functional group linked to the polysiloxane chain via a Si—C bond. Such acrylic derivatives are especially described in patents EP 281 718 and FR 2 632 960.

As regards the polyorganosiloxanes having alkenyl ether functional groups, these are generally derived from a hydrosilylation reaction between oils containing Si—H structural units and compounds carrying alkenyl ether functional groups such as allyl vinyl ethers, allyl vinyl oxyethoxybenzene and the like. This type of compound is especially referred to in U.S. Pat. No. 5,340,898.

This additive is present in the silicone coating in an amount sufficient to allow the release force of the adhesive/silicone interface to be adjusted.

With regard to the amount of additive, this may vary widely.

However, the additive is preferably employed in an amount of about 0.1 to 20% by weight of the total silicone mixture. Of course, the amount of this additive can vary significantly depending on whether or not it is of a silicone nature.

Thus, in the particular case in which this additive is an organic acrylic derivative or an alkenyl ether, its amount is generally between about 0.1 and 10%, preferably about 0.5 and 5% and more preferably 1 and 3%.

On the other hand, an additive of the silicone type is preferably used in an amount up to 20% by weight and preferably 15% by weight.

Moreover, this concentration of additive dispersed within the silicone matrix constitutes in itself a parameter for adjusting the release force.

It also seems that the amount of radiation, generally expressed as the UV radiation dose, is a useful parameter for varying the activity of the additive defined above and therefore for adjusting the level of the release force generated by this additive to the desired value by photochemical activation.

Thus, in the examples given below, it will be noted that the level of adhesion of the silicone coating to the adhesive coating with which it is associated is significantly increased after irradiation. Advantageously, the adhesion force proves to vary according to the number of passes beneath the UV lamps and therefore depends on the UV energy received.

This UV energy may be delivered by any suitable device, either as a flash or as stroboscopic illumination. As nonlimiting illustrations of UV radiation sources that can be used to activate the additive, mention may especially be made of UV systems of the microwave-lamp or arc lamp type.

Consequently, the invention has the advantage of providing a silicone/adhesive complex for which it proves to be possible to modify the release force of its silicone/adhesive interface depending, on the one hand, on the amount of additive incorporated and, on the other hand, on the amount of radiation applied to this interface.

According to a first embodiment of the invention, the silicone coating may derive from the polymerization and/or crosslinking of monomers, oligomers and/or polymers possessing at least one unsaturated aliphatic reactive group per molecule and of monomers, oligomers and/or polymers having at least one reactive Si—H radical.

In fact, what is involved is a hydrosilylation reaction between the two types of polyorganosiloxanes. The hydrosilylation reaction conditions are conventional conditions which fall within the competence of a person skilled in the art.

According to one particular variant of this embodiment of the invention, the silicone coating derives from the polymerization and/or crosslinking of at least one polyorganosiloxane of type A, as described below, having, per molecule, at least one reactive Si—H radical and containing no silicon atom linked to more than two hydrogen atoms and, on the other hand, a polyorganosiloxane of type B having, per molecule, at least one reactive unsaturated aliphatic group.

Advantageously, the polyorganosiloxanes of type A are chosen from polyorganohydrogenosiloxanes comprising:
units of the following formula:

     (1)

in which:
the symbols W, which are similar and/or different, represent:
a linear or branched alkyl radical containing 1 to 18 carbon atoms, optionally substituted with at least one halogen, preferably fluorine, the alkyl radicals preferably being methyl, ethyl, propyl, octyl and 3,3,3,-trifluoropropyl,
a cycloalkyl radical containing between 5 and 8 cyclic carbon atoms, optionally substituted with at least one halogen, preferably fluorine,
an aryl radical containing between 6 and 12 carbon atoms which may optionally be substituted on the aryl part with halogens, alkyls, and/or alkoxyls containing 1 to 3 carbon atoms, preferably phenyl or dichlorophenyl,
an arylalkyl part having an alkyl part containing between 5 and 14 carbon atoms and an aryl part containing between 6 and 12 carbon atoms, optionally substituted on the aryl part by halogens, alkyls and/or alkoxyls containing 1 to 3 carbon atoms,
a is 1 or 2, b is 0, 1 or 2, with the sum (a+b) having a value of between 1 and 3; and
optionally, other units of average formula

     (2)

in which W has the same meaning as above and c has a value of between 0 and 3.

The polyorganosiloxane of type A may be formed from units of formula (1) only or may also include units of formula (2).

It may have a linear, branched or unbranched, cyclic or network structure. The degree of polymerization is greater than or equal to 2. More generally, it is less than 5000.

Examples of units of formula (1) are:

When these are linear polymers, they essentially consist of $W_2SiO_{2/2}$ and $WHSiO_{2/2}$ "D" units and $W_3SiO_{1/2}$ and $WH_2SiO_{1/2}$ "M" units, the chain-stopping terminal "M" units possibly being trialkylsiloxy and dialkylarylsiloxy groups.

As examples of terminal "M" groups, mention may be made of trimethylsiloxy, dimethylphenylsiloxy, dimethylethoxysiloxy and dimethylethyltriethoxysilylsiloxy groups.

As examples of "D" units, mention may be made of dimethylsiloxy and methylphenylsiloxy groups.

These linear polyorganosiloxanes may be oils having a dynamic viscosity at 25° C. of around 1 to 100 000 mPa·s at 25° C., generally around 10 to 5000 mPa·s at 25° C., or gums having a molecular mass of around 1 000 000.

When these are cyclic polyorganosiloxanes, they consist of "D" units $W_2SiO_{2/2}$, and $WHSiO_{2/2}$, which may be of the dialkylsiloxy or alkylarylsiloxy type. They have a viscosity of around 1 to 5000 mPa·s.

The dynamic viscosity at 25° C. of all the polymers considered in the present specification may be measured using a Brookfield viscometer according to the AFNOR NFT 76 102 standard of February 1972.

Examples of polyorganosiloxanes of type A are:
dimethylpolysiloxanes having hydrogenodimethylsilyl end groups;
dimethylhydrogenomethylpolysiloxane copolymers having trimethylsilyl end groups;
dimethylhydrogenomethylpolysiloxane copolymers having hydrogenodimethylsilyl end groups;
hydrogenomethylpolysiloxanes having trimethylsilyl end groups; and
cyclic hydrogenomethylpolysiloxanes.

With regard to the polyorganosiloxanes of type B, namely those having at least one unsaturated aliphatic reactive group per molecule, these are preferably selected from polyorganosiloxanes comprising similar or different units of formula (3):

in which:
the symbols W', which are similar and/or different, correspond to the same definition as that given above in the case of W,
the symbols Y are similar or different and represent a $C_1$–$C_{12}$ linear or branched alkenyl residue having at least one ethylenically unsaturated group at the chain end and/or in the chain, and optionally at least one heteroatom;
e is equal to 1 or 2, d is equal to 0, 1 or 2 with the sum (d+e) having a value of between 1 and 3;
optionally, other units of average formula

in which W' has the same meaning as above and c has a value of between 0 and 3.

With regard to the residues Y, these are advantageously chosen from the following list: vinyl, propenyl, 3-butenyl, 5-hexenyl, 9-decenyl, 10-undecenyl, 5,9-decadienyl and 6-11-dodecadienyl.

These polyorganosiloxanes may have a linear (branched or unbranched), cyclic or network structure. Their degree of polymerization is preferably between 2 and 5000.

When these are linear polymers, they essentially consist of $W'SiO_{2/2}$, $Y_2SiO_{2/2}$ and $W'_2SiO_{2/2}$ "D" units and $W'YSiO_{1/2}$, $W'_2YSiO_{1/2}$ and $W'_3SiO_{1/2}$ "M" units, the chain-stopping terminal "M" units possibly being trialkylsiloxy, dialkylarylsiloxy, dialkylvinylsiloxy or dialkylalkenylsiloxy groups.

Said linear polyorganosiloxanes may be oils having a dynamic viscosity at 25° C. of around 1 to 100 000 mPa·s at 25° C., generally around 10 to 5000 mPa·s at 25° C., or gums having a molecular mass of around 1 000 000.

When these are cyclic polyorganosiloxanes, they essentially consist of $W'SiO_{2/2}$, $W'YSiO_{2/2}$ and $W'_2SiO_{2/2}$ "D" units, which may be of the dialkylsiloxy, alkylarylsiloxy, alkylvinylsiloxy or alkylsiloxy type; examples of such units have already been mentioned above.

Said cyclic polyorganosiloxanes of type B have a viscosity of around 1 to 5000 mPa·s.

The polyorganosiloxanes of type B having aliphatic unsaturation, which are useful within the context of the process according to the invention, are, for example, those having olefinically or acetylenically unsaturated groups, these being well known in the technical field in question. In this regard, reference may be made to U.S. Pat. Nos. 3,159,662, 3,220,272 and 3,410,886 which describe the abovementioned compounds.

According to an advantageous variant of this embodiment according to the invention, the reaction mixture comprises polyorganosiloxanes of type A and polyorganosiloxanes of type B in an amount such that the SiH/reactive unsaturated groups molar ratio is between 0.4 and 10, preferably between 1 and 4 and more preferably still is around 1.7.

The thermally activated hydrosilylation reaction conditions are conventional conditions. They are generally catalyzed by heat-sensitive platinum complexes. As representatives of these catalysts, mention may especially made of Karstedt's catalyst. The catalyst is present in an amount of 1 to 400, preferably from 10 to 300 and more preferably from 20 to 200 ppm of platinum metal expressed by weight with respect to the polyorganosiloxane compound used.

Apart from this catalyst, the components of the silicone coating contain an inhibitor for the reaction. In fact, heat is employed to deactivate this inhibitor and allow crosslinking to start. Especially suitable as inhibitors are dialkyl carboxylic esters, such as a dialkyl maleate, or hydroperoxides.

Silicone oil crosslinking reactions, particularly Si—H/Si—Vi type hydrosilylation catalyzed by heat-sensitive platinum complexes, obey a homogeneous catalysis process.

In the second embodiment of the invention, the silicone coating derives from a polymerization and/or crosslinking reaction between at least one type A polyorganosiloxane derivative possessing at least one reactive Si—H radical per molecule, and preferably as defined above, and at least one polyorganosiloxane having at least one reactive Si—OH radical per molecule and which preferably meets the definition of the polyorganosiloxane of type C described below. This reaction is in fact a dehydrogeno condensation.

The polyorganosiloxanes of type C are chosen from polyorganosiloxanes comprising:
units of the following formula (4):

in which:
the symbols W", which are similar or different, are defined as W according to formula (1),
f is 1 or 2, g is 0, 1 or 2, with the sum (f+g) having a value of between 1 and 3;
and optionally, other units of formula (2"):

in which W" has the same meaning as above and c has a value of between 0 and 3.

The polyorganosiloxane of type C may be formed from units of formula (4) only or may also include units of formula (2").

It may have a linear, branched or unbranched, cyclic or network structure. The degree of polymerization is greater than or equal to 2. More generally, it is less than 5000.

Examples of units of formula (4) are:

$$HO(CH_3)SiO_{1/2}, HOCH_3SiO_{2/2} \text{ and } HO(C_6H_5)SiO_{2/2}.$$

When these are linear polymers, they essentially consist of W"(OH)SiO$_{2/2}$, (OH)$_2$SiO$_{2/2}$ and W"$_2$SiO$_{2/2}$ "D" units and W"(OH)$_2$SiO$_{1/2}$ and W"$_3$SiO$_{1/2}$ "M" units.

These linear polyorganosiloxanes may be oils having a dynamic viscosity of around 1 to 100 000 mPa·s at 25° C., generally around 10 to 5000 mPa·s at 25° C., or gums having a molecular mass of around 1 000 000.

When these are cyclic polyorganosiloxanes, they consist of W"(OH)SiO$_{2/2}$, (OH)$_2$SiO$_{2/2}$ and W"$_2$SiO$_{2/2}$ "D" units which may be of the dialkylsiloxy or alkylarylsiloxy type. They have a viscosity of around 1 to 5000 mPa·s.

According to an advantageous variant of this embodiment of the invention, the polyorganosiloxanes of type A used comprise from 1 to 50 Si—H units per molecule and/or the polyorganosiloxanes of type C used comprise from 1 to 50 Si—OH units per molecule.

Moreover, in practice, within the reaction mixture, at least one of the polyorganosiloxanes of type A comprises at least three Si—H radicals and at least one of the polyorganosiloxanes of type C comprises at least two Si—OH groups.

The reaction conditions for dehydrogeno condensation between the polyorganosiloxanes of type A and the polyorganosiloxanes of type C are conventional conditions, for example by thermal-type activation in the presence of a catalyst (W. Alternoll "Chemistry and Technology of Silicones", Edition 68, chapter 5, page 201–205).

With regard to the third embodiment of the invention according to which the coating derives from a polymerization and/or crosslinking reaction between at least one type-A polyorganosiloxane derivative possessing at least one reactive Si—H radical per molecule, and preferably as defined above, and at least one polyorganosiloxane having at least one reactive epoxy, oxetane and/or dioxolane type unit per molecule, the latter polyorganosiloxane is preferably a polyorganosiloxane of type D chosen from polyorganosiloxanes comprising:

units of the following formula (5):

in which:
the symbols W'", which are similar and/or different, correspond to the same definition as given for W in formula (1);
the symbols Z are similar or different and represent:
a group W'",
a hydrogen radical, and/or
an epoxy functional, oxetane functional, dioxolane functional and/or alkenyl ether functional group, linked to the silicon of the polyorganosiloxane via a divalent radical containing from 2 to 20 carbon atoms and possibly containing at least one heteroatom, preferably oxygen,
with at least one of the symbols Z representing a crosslinkable functional organic group;

h is equal to 1 or 2, i is equal to 0, 1 or 2 with the sum (h+i) having a value of between 1 and 3;
optionally, other units of formula (2'):

in which W'" has the same meaning as above and c has a value of between 0 and 3.

According to an advantageous variant of this embodiment of the invention, the polyorganosiloxanes used contain from 3 to 10 organofunctional groups per macromolecular chain. For an epoxy functional group, this corresponds to epoxyde levels varying from 20 to 2000 molar meq./100 g of polyorganosiloxane.

In the case of the present invention, the silicone coating consists of a matrix within which the crosslinking and/or polymerization points are different from acrylic crosslinking nodes.

According to the first variant of the invention, which involves the polymerization and/or crosslinking of a polyorganosiloxane of Si—H type with a polyorganosiloxane carrying at least one reactive unsaturated aliphatic group, the crosslinking points are formed by alkyl or alkenyl links which may, where appropriate, contain a heteroatom. According to the second variant of the invention, involving the polymerization and/or crosslinking of a polyorganosiloxane having reactive Si—H units with a polyorganosiloxane having reactive Si—OH units, these crosslinking points are formed by siloxane links. Finally, in the third variant of the invention, in which the silicone matrix derives from the polymerization and/or crosslinking of a polyorganosiloxane having reactive Si—H units with a polyorganosiloxane carrying at least one reactive epoxy, oxetane and/or dioxolane type unit, these crosslinking points are silylether-type links.

According to a preferred embodiment of the invention, the silicone coating derives from the polymerization and/or crosslinking of monomers, oligomers and/or polymers possessing at least one Si—H reactive group and preferably polyorganosiloxanes of type A with monomers, oligomers and/or polymers possessing at least —Si—Ch═CH$_2$ reactive groups, and preferably polyorganosiloxanes of type B having reactive —Si—CH═CH$_2$ units.

This type of matrix proves to be particularly advantageous in terms of solubility with respect to the additive, which is acrylic in nature.

Conventionally, the silicone coating may optionally incorporate various additives. These are, for example, mineral or non-mineral fillers and/or pigments, such as synthetic or natural fibers, calcium carbonate, talc, clay, titanium dioxide or fumed silica. This may especially allow the mechanical properties of the final materials to be improved.

Soluble dyes, oxidation inhibitors and/or any other material not interfering with the catalytic activity of the platinum complex and the release-force-regulating activity of the additive may also be added to the components of the silicone coating.

With regard to the adhesive coating, it is possible to choose an acrylic adhesive in aqueous phase or solvent phase, a rubber in aqueous phase or in solvent phase, hot-melt gums or acrylics, latices or other suitable adhesives.

More particularly suitable to the invention are acrylic adhesives in aqueous phase or preferably in solvent phase.

In general, the adhesives, coated on the surface of a wide variety of materials so as to obtain labels, tapes or any other self-adhesive material, are emulsions called pressure-sensitive adhesive (PSA) emulsions which derive from acrylic polymers. They give the material the ability to adhere to the surface of a substrate, without requiring any activation other than slight pressure. Conventionally, PSAs are obtained by the polymerization, predominantly, of alkyl acrylate monomers which are generally present in an amount from 50 to about 99% and preferably in an amount from 80 to 99% by weight and of copolymerizable polar monomers such as, for example, acrylic acid, in smaller proportions.

The monomers, used to prepare the PSAs, are selected according to their glass transition temperature, Tg, in order to give the polymers incorporating them the expected behavior in terms of adhesion and viscoelasticity. For this purpose, the monomers advantageously possess a glass transition temperature which is low enough, generally between −70 and −10° C., and is preferably less than −30° C.

More specifically, these monomers are chosen from the group consisting of:
- (meth)acrylic esters, such as esters of acrylic acid and of methacrylic acid with hydrogenated or fluorinated $C_1$–$C_{12}$, preferably $C_1$–$C_8$, alkanols, particularly, methyl acrylate, ethyl acrylate, propyl acrylate, n-butyl acrylate, isobutyl acrylate, 2-ethylhexyl acrylate, tert-butyl acrylate, hexyl acrylate, heptyl acrylate, octyl acrylate, isooctyl acrylate, decyl acrylate, dodecyl acrylate, methyl methacrylate, ethyl methacrylate, n-butyl methacrylate and isobutyl methacrylate;
- vinyl nitriles including more particularly those having from 3 to 12 carbon atoms, such as, in particular, acrylonitrile and methacrylonitrile;
- vinyl esters of carboxylic acid, such as vinyl acetate, vinyl versatate and vinyl propionate;
- ethylenically unsaturated monocarboxylic and dicarboxylic acids, such as acrylic acid, methacrylic acid, itaconic acid, maleic acid and fumaric acid, and monoalkyl and dialkyl esters of monocarboxylic and dicarboxylic acids of the type mentioned with alkanols preferably having from 1 to 8 carbon atoms and their N-substituted derivatives;
- amides of unsaturated carboxylic acids, such as acrylamide, methacrylamide, N-methylolacrylamide or methacrylamide, and N-alkylacrylamides;
- ethylenic monomers containing a sulfonic acid group and its ammonium or alkali metal salts, for example vinylsulfonic acid, vinylbenzenesulfonic acid, alpha-acrylamidomethylpropanesulfonic acid and 2-sulfoethylene methacrylate;
- unsaturated ethylenic monomers containing a secondary, tertiary or quaternary amino group, or a heterocyclic group containing nitrogen, such as, for example, vinylpyridines, vinylimidazole, aminoalkyl (meth)acrylates and aminoalkyl (meth)acrylamides such as dimethylaminoethyl acrylate or dimethylaminoethyl methacrylate, di-tert-butylaminoethyl acrylate or di-tert-butylaminoethyl methacrylate and dimethylaminomethylacrylamide or dimethylaminomethylmethacrylamide;
- zwitterionic monomers such as, for example, sulfopropyl (dimethyl)aminopropyl acrylate;
- ethylenic monomers carrying a sulfate group;
- ethylenic monomers carrying one or more phosphate and/or phosphonate functional groups; and
- mixtures thereof.

Preferably, the monomers used in the emulsion polymerization are predominantly alkyl (meth)acrylate monomers present in an amount from 50% to about 99% and preferably in an amount from 80% to 99% by weight with respect to the weight of monomers present in the emulsion.

More preferably, they are chosen from 2-ethylhexyl acrylate, butyl acrylate, hexyl acrylate, heptyl acrylate, octyl acrylate, isooctyl acrylate, decyl acrylate, isobutyl acrylate, dodecyl acrylate or mixtures thereof, or methacrylates such as n-butyl methacrylate, methacrylic acid, acrylic acid, itaconic acid, maleic acid and/or acrylamide.

The process for preparing the PSAs relating to the present invention generally involves the emulsion polymerization, by means of radicals at atmospheric pressure and at a temperature of generally between 10 and 90° C., of the corresponding monomers. Conventionally, this polymerization technique requires, apart from the radical initiator, a mixture of anionic and/or nonionic emulsifiers in order to stabilize said emulsion.

These PSAs may, of course, be used in a formulated form, that is to say as a compound with conventional additives for adhesives, such as wetting agents, tackifiers, etc.

Conventionally, the complexes according to the invention may furthermore include one or more additives chosen depending on the intended final application.

The additives may especially be compounds, optionally in the form of polymers, having labile hydrogens, such as alcohols, glycols and polyols, useful in particular for improving the flexibility of the silicone matrix after polymerization and/or crosslinking; mention may be made, for example, of polycaprolactone-polyols, in particular the polymer obtained initially from 2-ethyl-2-(hydroxymethyl)-1,3-propanediol and from 2-oxepanone, such as the product TONE POLYOL-301 sold by Union Carbide, or the other commercial polymers TONE POLYOL 201 and TONE POLYOL 12703 from Union Carbide. Mention may also be made, as additives, of long alkyl-chain diacids, fatty esters of unsaturated acids which may or may not be epoxidized, for example epoxidized soybean oil or epoxidized linseed oil, epoxidized 2-ethylhexyl ester, 2-ethylhexyl epoxystearate, octyl epoxystearate, epoxidized acrylic esters, epoxidized soybean oil acrylates, epoxidized linseed oil acrylates, diglycidyl ether of polypropylene glycol, long-chain aliphatic epoxides, etc.

Irrespective of the nature of the polymerizable matrix, they may also be, for example: fillers such as, in particular, ground natural or synthetic (polymeric) fibers, calcium carbonate, talc, clay, titanium dioxide, precipitated silica or pyrogenic silica; soluble dyes; oxidation and corrosion inhibitors; organosilicic or nonorganosilicic adhesion modulators; fungicides, bactericides antimicrobial agents; and/or any other material not interfering with the activity of the additive according to the invention.

The complexes are most particularly beneficial when they are used as such, in order to make a material nonstick, such as metal foils, glass, plastics or paper, with respect to other materials to which they would normally adhere. The subject of the invention is also the corresponding materials.

The amounts of silicone coating deposited on the substrates usually range from 0.1 and 5 $g/m^2$ of surface treated. These amounts depend on the nature of the substrates and on the desired nonstick properties. They are usually between 0.5 and 1.5 $g/m^2$ in the case of nonporous substrates.

With regard to the amounts of adhesive coating, these are preferably less than 200 $g/m^2$ and more preferably less than 100 g/m². The adhesive coating may be deposited by any conventional method of application. In particular, they may be applied by transfer.

The substrates may be a metal material, such as tinplate, and preferably a cellulosic material of the paper or board type for example, or a polymeric material of the vinyl type. Thermoplastic polymeric films, such as polyethylene, polypropylene or polyester films, are particularly advantageous.

In the embodiment in which the adhesive coating is in contact with a substrate consisting of a second material, this second material may be chosen from the materials proposed for the first substrate and may or may not be identical in nature to the first substrate.

Finally, the substrate to which the silicone coating and/or the adhesive coating are/is applied may already have been coated with an initial coating on which a coating according to the invention is superimposed, provided that this attached coating is transparent to the photochemical radiation used.

The subject of the present invention is also the articles (for example foils) consisting of a solid material (metal, glass, plastic, paper, etc.), at least one surface of which is coated with a complex according to the invention. These may especially be labels, self-adhesive sheets or adhesive tapes.

A second aspect of the present invention relates to the use of an additive according to the invention in a silicone coating, intended to form a silicone/adhesive complex, in order to adjust the release force of a silicone/adhesive interface by photochemical activation of said additive.

The examples and figures which follow are given by way of illustration and imply no limitation of the present invention.

EXAMPLE 1

A standard heat-curable silicone formulation was used, comprising:

a first vinyl-terminated silicone oil referred to as being of type B. It had the formula:

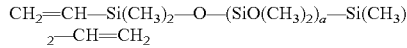

with a=136.

This oil contained 0.15% by weight of ethynyl cyclohexanol inhibitor.

The second silicone oil was a Si—H-functionalized silicone oil, referred to as being of type A, of formula:

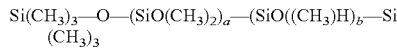

with a=25 and b=51.

The catalyst was platinum-based Karstedt's catalyst: 2000 ppm of platinum diluted in a vinyl oil.

The formulation was adjusted in order to have a Si—H/SiVi molar ratio of 1.7 and a platinum content of around 100 ppm.

The additive was formed by an acrylate silicone oil sold by Rhodia: Silcolease® resin 21621.

It was added in an amount of 10 parts to the abovementioned silicone formulation and the detailed composition of the formulation is given in table I below, which shows, as a comparison, the composition of a formulation without the additive:

TABLE I

| Bath formulation | Control formulation | Formulation with additive |
|---|---|---|
| Vinyl oil | 100 | 90 |
| Crosslinking agent | 2.5 | 2.2 |
| Pt catalyst | 5 | 5 |
| Acrylate oil | 0 | 10 |

Each of the formulations was coated at a rate of 50 m/min onto a propylene film (OPP CR 50 from UCB) by means of a ROTOMEC pilot coater. The silicone coating was crosslinked by passage through a thermal oven heated to 150° C.

The amount deposited was about 1.2 g/m² in order to ensure good coverage of the substrate. Adhesive was then applied to the coating, using an acrylic adhesive tape, namely TESA® 4970. The complex was irradiated by a UV lamp (IST lamp/mercury arc tube). These cycles consist in making one or more successive passes beneath the UV lamp of the IST rig set at a power of 160 W/cm and at a pass speed of 50 m/min. This irradiation was carried out through the substrate film and the silicone layer. Several passes beneath the lamp may be carried out. The complex was then separated using a peel test according to the FINAT 3 standard.

The adhesion values obtained on a complex without additive and a complex according to the invention were compared.

Figure 1:
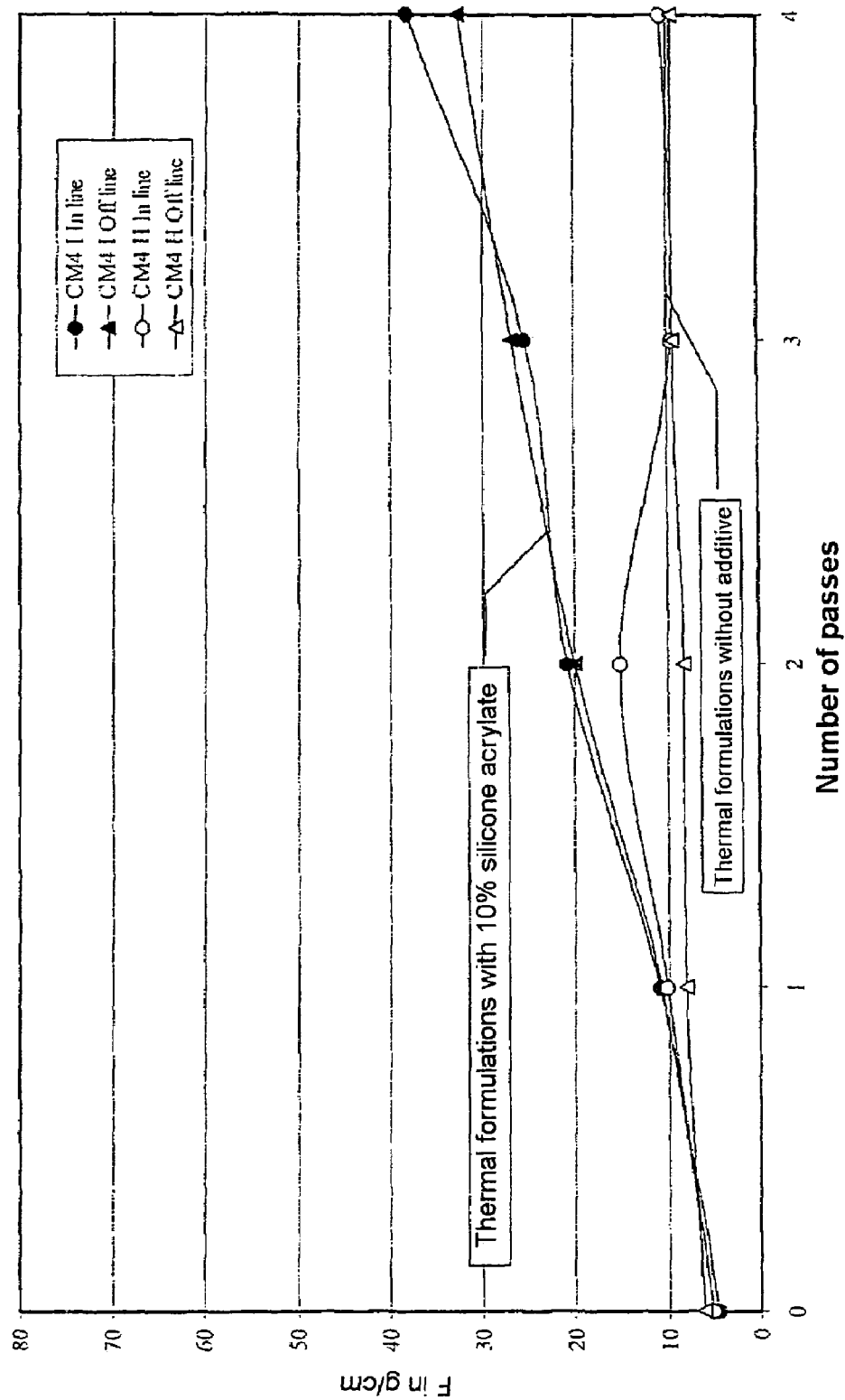
FIG. 1: Variation in the level of adhesion as a function of the number of passes beneath the UV lamp of an adhesive/silicone complex comprising a thermal silicone to which an acrylate silicone oil has been added.

The results are shown in FIG. 1.

Secondly, the release force of the complex according to the invention was determined as a function of the number of passes beneath the UV.

Figure 2:
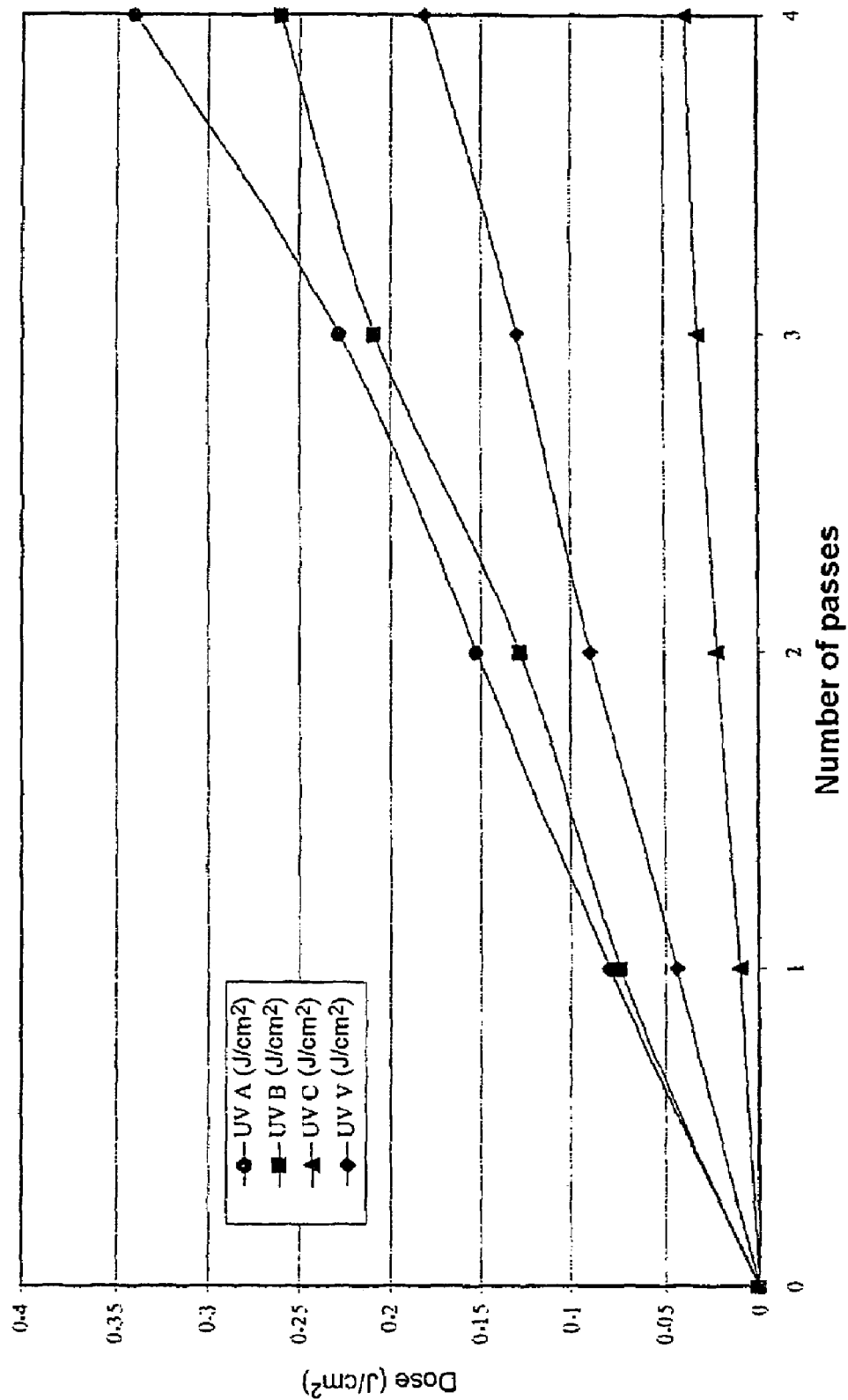
FIG. 2: A graphical representation of the intensity of the emitted UV irradiation dose as a function of the number of passes beneath the UV lamp.

FIG. 2 shows the results obtained.

It will be noted in both cases that the level of adhesion of the PSA is increased after irradiation. This adhesion force depends on the number of passes beneath the UV lamp and therefore on the UV energy received by the assembly. The varying effect after UV irradiation of the complex is therefore verified in this example.

What is claimed is:

1. A method for regulating the release force of a silicone/adhesive interface in a silicone/adhesive complex, the method comprising applying at least one silicone coating to a first substrate and applying an adhesive coating to a second substrate, wherein said silicone coating is derived from the thermal polymerization and/or thermal crosslinking of:

either monomers, oligomers and/or polymers carrying at least one reactive Si—H structural unit and monomers, oligomers and/or polymers carrying at least one reactive unsaturated aliphatic group;

or monomers, oligomers and/or polymers carrying at least one reactive Si—H structural unit and monomers, oligomers and/or polymers carrying at least one reactive Si—OH unit;

or monomers, oligomers and/or polymers carrying at least one reactive Si—H structural unit and monomers, oligomers and/or polymers carrying at least one reactive epoxy, oxetane and/or dioxolane;

wherein said silicone coating comprises an additive selected from the group consisting of an organic acrylic, an acrylic silicone and a silicone having alkenyl ether functional groups, and wherein the activity of said additive is initiated and adjustable photochemically.

2. The method as claimed in claim 1, wherein the two substrates comprise two separate entities placed so that the silicone coating of the first substrate is in contact with the adhesive coating of the second substrate.

3. The method as claimed in claim 1, wherein the two substrates each comprise respectively of the two faces of the same entity.

4. The method as claimed in claim 1, wherein the activity of the additive for regulating the release force is initiated and adjusted by exposing at least the silicone/adhesive interface to at least UV irradiation.

5. The method as claimed in claim 1, wherein the additive for regulating the release force is an organic acrylic selected from the group consisting of epoxidized acrylates; acrylo-glycero-polyesters; multifunctional acrylates; acrylo-urethanes; acrylo-polyethers; acrylo-polyesters; and acrylo-acrylics.

6. The method as claimed in claim 1, wherein the additive for regulating the release force is an acrylic silicone and/or a silicone having alkenyl ether functional groups.

7. The method as claimed in claim 6, wherein the acrylic silicones comprise polyorganosiloxanes having an acrylate and/or methacrylate functional group linked to the polysiloxane chain via an Si—C bond.

8. The method as claimed in claim 1, wherein the additive for regulating the release force is employed in an amount from 0.1 to 20% by weight of the total silicone mixture.

9. The method as claimed in claim 1, wherein the silicone coating is derived from the polymerization and/or crosslinking of at least one polyorganosiloxane of type A having, per molecule, at least one reactive Si—H radical and containing no silicon atom linked to more than two hydrogen atoms and at least one polyorganosiloxane of type B having, per molecule, at least one reactive unsaturated aliphatic group.

10. The method as claimed in claim 9, wherein the polyorganosiloxane of type A is a polyorganohydrogenosiloxane comprising:

units of the following formula:

  (1)

in which:
the symbols W, which are similar and/or different, represent:
a linear or branched alkyl radical comprising 1 to 18 carbon atoms, optionally substituted with at least one halogen,
a cycloalkyl radical comprising between 5 and 8 cyclic carbon atoms, optionally substituted with at least one halogen,
an aryl radical containing between 6 and 12 carbon atoms which may optionally be substituted on the aryl radical with at least one halogen atom, or an alkyl and/or alkoxyl group comprising 1 to 3 carbon atoms,
an arylalkyl radical having an alkyl part comprising between 5 and 14 carbon atoms and an aryl part comprising between 6 and 12 carbon atoms, optionally substituted on the aryl part by at least one halogen atom, or an alkyl and/or alkoxyl group comprising 1 to 3 carbon atoms, a is 1 or 2, b is 0, 1 or 2, with the sum (a+b) having a value of between 1 and 3; and
optionally, other units of average formula (2):

  (2)

in which W has the same meaning as above and c has a value of between 0 and 3.

11. The method as claimed in claim 10, wherein the polyorganosiloxane of type A is selected from the group consisting of:
dimethylpolysiloxanes having hydrogenodimethylsilyl end groups;
dimethylhydrogenomethylpolysiloxane copolymers having trimethylsilyl end groups;
dimethylhydrogenomethylpolysiloxane copolymers having hydrogenodimethylsilyl end groups;
hydrogenomethylpolysiloxanes having trimethylsilyl end groups; and
cyclic hydrogenomethylpolysiloxanes.

12. The method as claimed in claim 9, wherein the polyorganosiloxane of type B is selected from polyorganosiloxanes comprising similar or different units of formula (3):

  (3)

in which:
the symbols W', which are similar and/or different, represent:
a linear or branched alkyl radical comprising 1 to 18 carbon atoms, optionally substituted with at least one halogen,
a cycloalkyl radical comprising between 5 and 8 cyclic carbon atoms, optionally substituted with at least one halogen,
an aryl radical comprising between 6 and 12 carbon atoms which may optionally be substituted on the aryl radical with at least one halogen atom, or an alkyl and/or alkoxyl group comprising 1 to 3 carbon atoms,
an arylalkyl radical having an alkyl part comprising between 5 and 14 carbon atoms and an aryl part comprising between 6 and 12 carbon atoms, optionally substituted on the aryl part by at least one halogen atom, or an arkly and/or alkoxyl group comprising 1 to 3 carbon atoms,
the symbols Y are similar or different and represent a $C_1$–$C_{12}$ linear or branched alkenyl residue having at least one ethylenically unsaturated group at the chain end and/or in the chain, and optionally at least one heteroatom;
e is equal to 1 or 2, d is equal to 0, 1 or 2 with the sum (d+e) having a value between 1 and 3;
optionally, other units of average formula (2'):

  (2')

in which W' has the same meaning as above and c has a value of between 0 and 3.

13. The method as claimed in claim 9, wherein the silicone coating is derived from the polymerization and/or crosslinking of at least one polyorganosiloxane of type A and of at least one polyorganosiloxane of type B in an amount such that the Si—H/reactive unsaturated group molar ratio is between 0.4 and 10.

14. The method as claimed in claim 9, wherein the silicone coating further comprises a heat-sensitive platinum complex catalyst.

15. The method as claimed in claim 9, wherein the silicone coating further comprises an inhibitor for the reaction.

16. The method as claimed in claim 1, wherein the silicone coating is derived from the polymerization and/or crosslinking of at least one polyorganosiloxane of type A having, per molecule, at least one reactive Si—H structural unit and of at least one polyorganosiloxane of type C having, per molecule, at least one reactive Si—OH structural unit.

17. The method as claimed in claim 16, wherein the polyorganosiloxane of type C is selected from the group consisting of polyorganosiloxanes comprising:
units of the following formula (4):

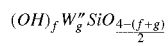   (4)

in which:
the symbols W", which are similar or different, represent:
a linear or branched alkyl radical comprising 1 to 18 carbon atoms, optionally substituted with at least one halogen,
a cycloalkyl radical comprising between 5 and 8 cyclic carbon atoms, optionally substituted with at least one halogen,
an aryl radical comprising between 6 and 12 carbon atoms which may optionally, be substituted on the aryl part with at least one halogen atom, or an alkyl and/or alkoxyl group comprising 1 to 3 carbon atoms,
an arylalkyl radical having an alkyl part comprising between 5 and 14 carbon atoms and an aryl part comprising between 6 and 12 carbon atoms, optionally substituted on the aryl part by at least one halogen atom, or an alkyl and/or alkoxyl group comprising 1 to 3 carbon atoms,
f is 1 or 2, g is 0, 1 or 2, with the sum (f+g) having a value of between 1 and 3; and
optionally, other units of formula (2"):

   (2")

in which W" has the same meaning as above and c has a value of between 0 and 3.

18. The method as claimed in claim 16, wherein the polyorganosiloxanes of type A used comprise from 1 to 50 Si—H units per molecule and/or the polyorganosiloxanes of type C used comprise from 1 to 50 Si—OH units per molecule.

19. The method as claimed in claim 16, wherein the polyorganosiloxane of type A having a reactive Si—H structural unit is selected from the group consisting of:
dimethylpolysiloxanes having hydrogenodimethylsilyl end groups;
dimethylhydrogenomethylpolysiloxane copolymers having trimethylsilyl end groups;
dimethylhydrogenomethylpolysiloxane copolymers having hydrogenodimethylsilyl end groups;
hydrogenomethylpolysiloxanes having trimethylsilyl end groups; and
cyclic hydrogenomethylpolysiloxanes.

20. The method as claimed in claim 1, wherein the silicone coating derived from the polymerization and/or crosslinking of at least one polyorganosiloxane of type A having, per molecule, at least one reactive Si—H radical and containing no silicon atom linked to more than two hydrogen atoms and of at least one polyorganosiloxane of type D carrying at least one unit of the reactive epoxy, oxetane and/or dioxolane.

21. The method as claimed in claim 20, wherein the polyorganosiloxane of type D is a polysiloxane comprising:
units of the following formula (5):

   (5)

in which:
the symbols W''', which are similar and/or different, represent:
a linear or branched alkyl radical comprising 1 to 18 carbon atoms, optionally substituted with at least one halogen atom,
a cycloalkyl radical comprising between 5 and 8 cyclic carbon atoms, optionally substituted with at least one halogen atom,
an aryl radical comprising between 6 and 12 carbon atoms which may optionally be substituted on the aryl radical with at least one halogen atom, an alkyl and/or alkoxyl group comprising 1 to 3 carbon atoms,
an arylalkyl radical having an alkyl part comprising between 5 and 14 carbon atoms and an aryl part comprising between 6 and 12 carbon atoms, optionally substituted on the aryl part by at least one halogen atom, an alkyl and/or alkoxyl group comprising 1 to 3 carbon atoms,
the symbols Z are similar or different and represent:
a group W''',
a hydrogen radical, and/or
an epoxy functional, oxetane functional, dioxolane functional and/or alkenyl ether functional group, linked to the silicon of the polyorganosiloxane via a divalent radical comprising from 2, to 20 carbon atoms and possibly containing at least one heteroatom,
with at least one of the symbols Z representing a reactive epoxy, oxetane and/or dioxolane;
h is equal to 1 or 2, i is equal to 0, 1 or 2 with the sum (h+i) having a value of between 1 and 3;
optionally, other units of formula (2'''):

   (2''')

in which W''' has the same meaning as above and c has a value of between 0 and 3.

22. The method as claimed in claim 21, wherein the polyorganosiloxanes of type D comprise from 3 to 10 reactive epoxy, oxetane and/or dioxolane per macromolecular chain.

23. The method as claimed in claim 1, wherein in the silicone coating, the crosslinks are formed by alkyl or alkenyl links, optionally interrupted by heteroatoms, siloxane links or silylether links.

24. The method as claimed in claim 1, wherein the adhesive coating is derived from a pressure-sensitive adhesive emulsion derived from acrylic polymers.

25. The method as claimed in claim 24, wherein the pressure-sensitive adhesive emulsions are obtained by polymerization predominantly of acrylate monomers present in an amount from 50 to about 90% by weight and, copolymerizable radical monomers.

26. The method as claimed in claim 25, wherein the monomers are selected from the group consisting of:
- (meth)acrylic esters;
- vinyl nitrites;
- vinyl esters of carboxylic acid;
- ethylenically unsaturated monocarboxylic and dicarboxylic acids;
- amides of unsaturated carboxylic acids;
- ethylenic monomers containing a sulfonic acid group and its ammonium or alkali metal salts;
- unsaturated ethylenic monomers containing a secondary, tertiary or quaternary amino group, or a heterocyclic group containing nitrogen;
- zwitterionic monomers;
- ethylenic monomers carrying a sulfate group;
- ethylenic monomers carrying one or more phosphate and/or phosphonate functional groups; and
- mixtures thereof.

27. The method as claimed in claim 1, wherein the coating is derived from the polymerization and/or crosslinking of a silicone oil carrying reactive Si—H groups with a silicone oil carrying reactive Si—CH=CH$_2$ groups.

28. A silicone/adhesive interface in a silicone/adhesive complex comprising at least one silicone coating applied to a first substrate and an adhesive coating applied to a second substrate, wherein said silicone coating is derived from the thermal polymerization and/or thermal crosslinking of:
- either monomers, oligomers and/or polymers carrying at least one reactive Si—H structural unit and monomers, oligomers and/or polymers carrying at least one reactive unsaturated aliphatic group;
- or monomers, oligomers and/or polymers carrying at least one reactive Si—H structural unit and monomers, oligomers and/or polymers carrying at least one reactive Si—OH unit;
- or monomers, oligomers and/or polymers carrying at least one reactive Si—H structural unit and monomers, oligomers and/or polymers carrying at least one reactive epoxy, oxetane and/or dioxolane;
- wherein said silicone coating comprises an additive selected from the group consisting of an organic acrylic, an acrylic silicone and an alkenyl ether, and wherein the activity of said additive is initiated and adjustable photochemically.

* * * * *